United States Patent
Barajas Gonzalez et al.

(10) Patent No.: US 9,881,427 B2
(45) Date of Patent: Jan. 30, 2018

(54) VEHICLE MAINTENANCE ANALYTICS AND NOTIFICATIONS

(71) Applicant: International Business Machines Corporation, Armonk, NY (US)

(72) Inventors: Emmanuel Barajas Gonzalez, Guadalajara (MX); Shaun E. Harrington, Sahuarita, AZ (US); Benjamin K. Rawlins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 14/887,388

(22) Filed: Oct. 20, 2015

(65) Prior Publication Data

US 2017/0109944 A1    Apr. 20, 2017

(51) Int. Cl.
| | |
|---|---|
| G07C 5/00 | (2006.01) |
| G07C 5/02 | (2006.01) |
| G07C 5/08 | (2006.01) |
| G06Q 10/02 | (2012.01) |
| G06Q 10/00 | (2012.01) |

(52) U.S. Cl.
CPC .............. *G07C 5/006* (2013.01); *G07C 5/02* (2013.01); *G07C 5/08* (2013.01); *G06Q 10/02* (2013.01); *G06Q 10/20* (2013.01)

(58) Field of Classification Search
CPC . G07C 5/006; G07C 5/02; G07C 5/08; G06Q 10/02; G06Q 10/20
See application file for complete search history.

(56) References Cited

U.S. PATENT DOCUMENTS

| | | | |
|---|---|---|---|
| 7,016,774 B2 | 3/2006 | Barber et al. | |
| 7,542,833 B2 | 6/2009 | Kelly et al. | |
| 8,060,274 B2 | 11/2011 | Boss et al. | |
| 8,190,322 B2 | 5/2012 | Lin et al. | |
| 8,874,305 B2 | 10/2014 | Dolgov et al. | |
| 8,880,270 B1 | 11/2014 | Ferguson et al. | |

(Continued)

FOREIGN PATENT DOCUMENTS

CN      102650882 A      8/2012

OTHER PUBLICATIONS

Pending U.S. Appl. No. 14/938,873, filed Nov. 12, 2015, entitled: "Autonomously Servicing Self-Driving Vehicles", 39 pages.

(Continued)

*Primary Examiner* — Thomas G Black
*Assistant Examiner* — Peter D Nolan
(74) *Attorney, Agent, or Firm* — L. Jeffrey Kelly; Douglas M. Crockatt (57) ABSTRACT

A computer-implemented method, computer program product, and system for vehicle maintenance are provided. The computer-implemented method may include predicting a future vehicle location based on a vehicle location history; predicting future vehicle usage from user information, wherein the user information includes information collected from a user's social media account; identifying maintenance needs of a vehicle; and determining available times for vehicle maintenance based on the future vehicle location and the user information.

14 Claims, 5 Drawing Sheets

(56) References Cited

U.S. PATENT DOCUMENTS

| | | | |
|---|---|---|---|
| 8,930,820 B1* | 1/2015 | Elwell | G06Q 10/109 |
| | | | 705/319 |
| 8,958,943 B2 | 2/2015 | Bertosa et al. | |
| 2006/0136105 A1 | 6/2006 | Larson | |
| 2010/0114423 A1* | 5/2010 | Boss | G06Q 10/06 |
| | | | 701/29.4 |
| 2010/0179720 A1 | 7/2010 | Lin et al. | |
| 2013/0024060 A1 | 1/2013 | Sukkarié et al. | |
| 2014/0040434 A1 | 2/2014 | Rybak et al. | |
| 2014/0188999 A1 | 7/2014 | Leonard et al. | |
| 2014/0277902 A1 | 9/2014 | Koch | |
| 2014/0310186 A1 | 10/2014 | Ricci | |
| 2014/0358331 A1 | 12/2014 | Prada Gomez et al. | |
| 2014/0358353 A1 | 12/2014 | Ibanez-Guzman et al. | |
| 2015/0134178 A1 | 5/2015 | Minoiu-Enache | |

OTHER PUBLICATIONS

Disclosed Anonymously, "Diagnostics Mechanism for Self-Driving Cars to validate Self-Driving Capabilities", An IP.com Prior Art Database Technical Disclosure, IP.com No. 000237171, IP.com Electronic Publication: Jun. 6, 2014, 5 pages.

\* cited by examiner

VEHICLE MAINTENANCE ANALYTICS AND NOTIFICATIONS

BACKGROUND

The present invention generally relates to vehicle maintenance, and more particularly to the vehicle monitoring in conjunction with analytics to track and determine proper vehicle maintenance schedules as it pertains to current and upcoming usage.

Vehicles such as cars, trucks, motorcycles, and the like use various wearable components and fluids that break down over time and need to be serviced. As such, vehicle manufacturers have provided a maintenance schedule for a vehicle with information such as how often the vehicle should be serviced. For example, the maintenance schedule may specify how often various fluids and/or components should be replaced, cleaned, adjusted, inspected, etc.

In addition, vehicles have included a fault detection system with visual indicators such as lights and meters that notify an owner when the vehicle should be serviced. Examples of such indicators include a check engine light, a lower oil pressure light, a charging system light, a brake system light, a temperature gauge, etc. Maintenance of some wearable components such as tires, windshield washer blades, etc. have been specified by the manufacturer of the component and/or determined through visual inspection.

Vehicle owners often take their vehicles to a mechanic for service rather than perform the maintenance on the vehicle themselves. Unfortunately, the owner may not always be aware of when their vehicle needs service. For instance, the owner may not remember or know that a component should be replaced after 50,000 miles, which may not be reached for 2 or more years after the purchase of the vehicle. Even when the owner is aware that the vehicle should be serviced, the owner has to locate a mechanic that performs the particular type of service and find the time to bring the vehicle to the mechanic. Moreover, the owner often has to wait at the service station until the service is completed or otherwise find temporary transportation. In some cases, the mechanic must bear the liability and expense of providing such temporary transportation.

SUMMARY

Embodiments of the present invention disclose a computer-implemented method, computer program product, and system for vehicle maintenance. The computer-implemented method may include predicting a future vehicle location based on a vehicle location history; predicting future vehicle usage from user information, wherein the user information includes information collected from a user's social media account; identifying maintenance needs of a vehicle; and determining available times for vehicle maintenance based on the future vehicle location and the user information.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Conventionally, owners of vehicles are tasked with becoming aware of when their aware vehicle should be serviced, selecting a mechanic, finding time to bring the vehicle to the mechanic, dropping off the vehicle with the mechanic, and picking up the vehicle after the service is performed. The present invention provides a system, method, and program product for identifying vehicle service needs based on predicted future locations and determined future usage of a vehicle. When it is determined that the vehicle should be serviced, the location information as well as other information such as the type of service can be conveyed to a mechanic or the like who can use the information to retrieve the vehicle and perform the service.

Figure 1:
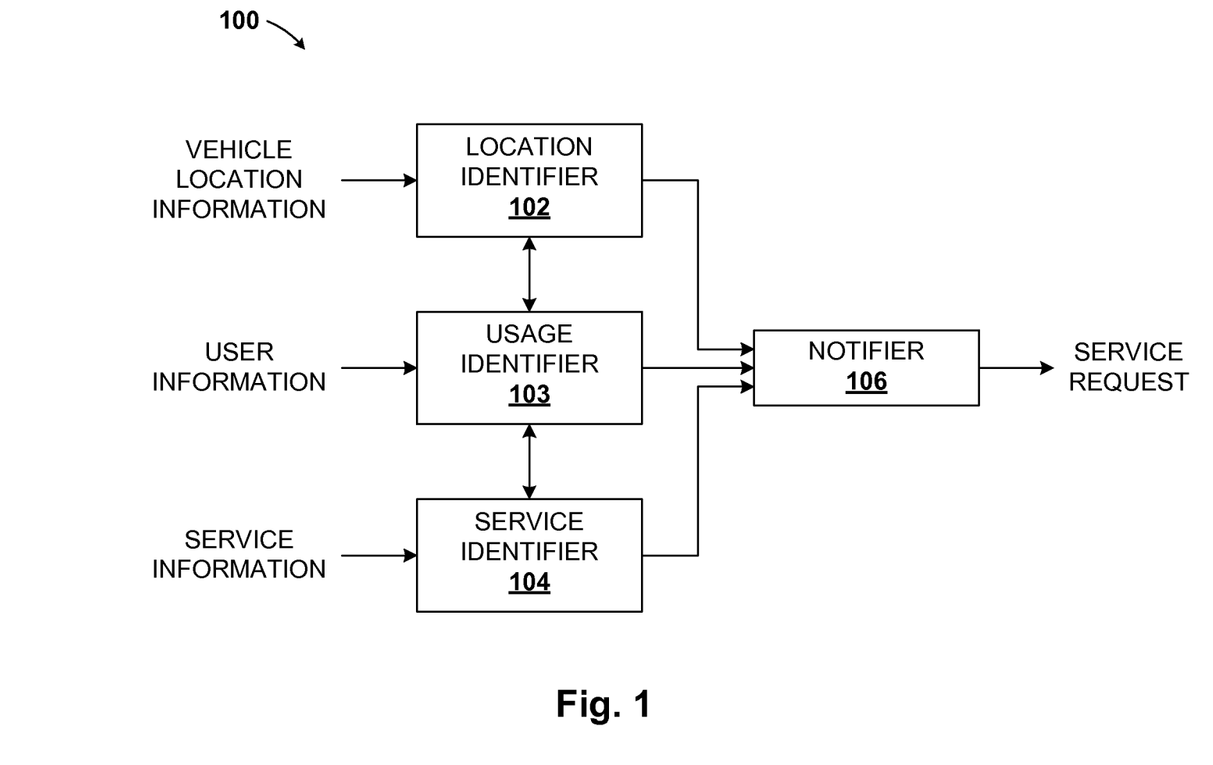
FIG. 1 is a block diagram illustrating a system for vehicle maintenance, according to an embodiment.

Referring now to FIG. 1, a system 100 for generating and providing location-based services for a vehicle is provided, according to an embodiment. The system 100 may reside in and/or operate in conjunction with a vehicle such as a car, a truck, a motorcycle, a boat, or the like. For example, the system 100 may be part of or operate in conjunction with the vehicle's computing system, the vehicle's computer, fault detection system, and/or various components within one or more sub-systems of the vehicle. Portions of system 100 may also be located externally from the vehicle in devices such as, for example, a computer, a mobile computing device, a cell phone, a component of a network, or at locations external from the vehicle such as, for example, at service stations or other networked locations. The system 100 may include a location identifier 102, a usage identifier 103, a service identifier 104 and a notifier 106.

The location identifier 102 identifies a future location at which the vehicle is likely to be throughout any day. The location identifier 102 may include a first parameter indicative of a likely future location of the vehicle at which the vehicle is available for service or maintenance and a second parameter indicative of a time and time duration that the vehicle is estimated to be at the future location. In one instance, the location identifier 102 obtains and aggregates vehicle location information over time, for example, over one or more days, over one or more months, over one or more years, or some combination thereof. The vehicle location information can be obtained by the location identifier 102 and/or provided to the location identifier 102 from a device external to the vehicle, a sub-system of the vehicle, or a component of the vehicle. For each location, the vehicle location information may be associated with temporal information, such as how long the vehicle will be at a location.

The usage identifier 103 may identify types of vehicle usage required by a user, where the user expects to be throughout a given time and/or the user's ability or desire to service the vehicle at any given time. To identify usage required by a user, the usage identifier 103 may use user information input from internal or external sources such as, but not limited to, a user's calendar, a user's social media account (e.g., twitter, facebook, etc.) and/or direct user input. The usage identifier 103 can apply predefined and/or user defined parameters to determine an ideal location and time for specific services. The usage identifier 103 may use parameters such as, for example, categorization, grouping, level of importance or event interruptibility.

For example, if a user's social media post refers to a road trip including ten stops before returning home, the ten stops can be grouped as a single trip and may be marked for servicing before or after the trip (depending on the type of service needed). For example, if a vehicle is being used for a cross-country trip, where the user is planning on spending a single day in the Midwest, it might not be desirable to schedule vehicle servicing for that day, even though the vehicle will be in one place for an entire day.

The usage identifier 103 may also assign a value of importance to events obtained from the user information. When a user event is assigned a high importance value, servicing may be scheduled earlier than needed for the vehicle to assure reliability during the highly important event. For example, a business trip might be assigned a higher importance value than a casual trip to the beach because the business trip may have larger consequences in the case of vehicle failure.

The usage identifier 103 may also determine whether or not a user event is interruptible. For example, a user might want to service their vehicle on a day allocated for running errands rather than a day allocated to tailgating for a sporting event. The usage identifier 103 may use a value range or a yes/no classification for specific user events.

The usage identifier 103 may also consider external factors such as, for example, weather and terrain. For example, a user's social media post might include the specific route for a road trip, where the route includes driving through mountains, areas having inclement weather or areas having gravel side roads. The usage identifier 103 may determine that the installation of, for example, a new car batter or tires should be performed before the user's trip.

The location identifier 102 and the usage identifier 103 may together use the location and time obtained from the vehicle location information and the user information to generate a schedule predicting where the vehicle is likely to be on a given day and whether or not that is a desirable time for the user to service the vehicle.

The service identifier 104 identifies a type of service or maintenance that should be performed on the vehicle from vehicle information. In one instance, the service identifier 104 obtains information indicative of the type of maintenance to be performed from the vehicle, for example, from a component of the vehicle and/or the vehicle's fault sensing system and/or indicia such as a service flag or the like. Additionally or alternatively, the service identifier 104 may obtain such vehicle information from a maintenance schedule or service history. This vehicle information can be obtained from a device external to the vehicle and stored in memory and/or other information storage device. The service identifier 104 may use the above information to identify the type of maintenance as well as recommend maintenance to be performed along with the identified type of maintenance. Examples of suitable maintenance include replacing, cleaning, adjusting, checking, inspecting, etc. various fluids and/or components.

The notifier 106 conveys the vehicle information from the location identifier 102, the usage identifier 103, and the service identifier 104 to a suitable recipient via a wire or wireless communication channel. In one instance, this may include sending a service request to one or more mechanics, to one or more service stations, to an auction house where mechanics can bid on or otherwise accept the service request, to a broker that pre-negotiated service costs, to a user of the vehicle, to a third party, and/or to any other recipient. A recipient may be determined based on the location and/or service information, as well as other information, such as a preference of the user. The notifier 106 may also filter the vehicle information, and/or convey the filtered vehicle information to the recipient.

The recipient of the service request may contact the vehicle user to confirm or change the service appointment. For instance, an appointment may need to be changed based on a mechanic's schedule or the mechanic's estimated time to complete the service. Likewise, the vehicle user can contact the recipient to change any of the information in the service request. Furthermore, the user and the recipient may communicate to make arrangements regarding obtaining a key and/or key code, deactivating an alarm, billing for the service, and/or other information related to the service. This information may also be provided in the service request.

The location identifier 102, the usage identifier 103, the service identifier 104 and the notifier 106 can communicate with devices external to the vehicle and/or sub-systems of the vehicle through various communication channels. For instance, they can communicate over a wire such as through a serial communication port, a USB port, an Ethernet port, and the like, and/or wirelessly such as via a cell tower, an infrared port, a radio frequency transceiver, an optical port, and the like. Furthermore, such communication may include sending and/or receiving instructions, parameters, signals, etc.

Figure 2:
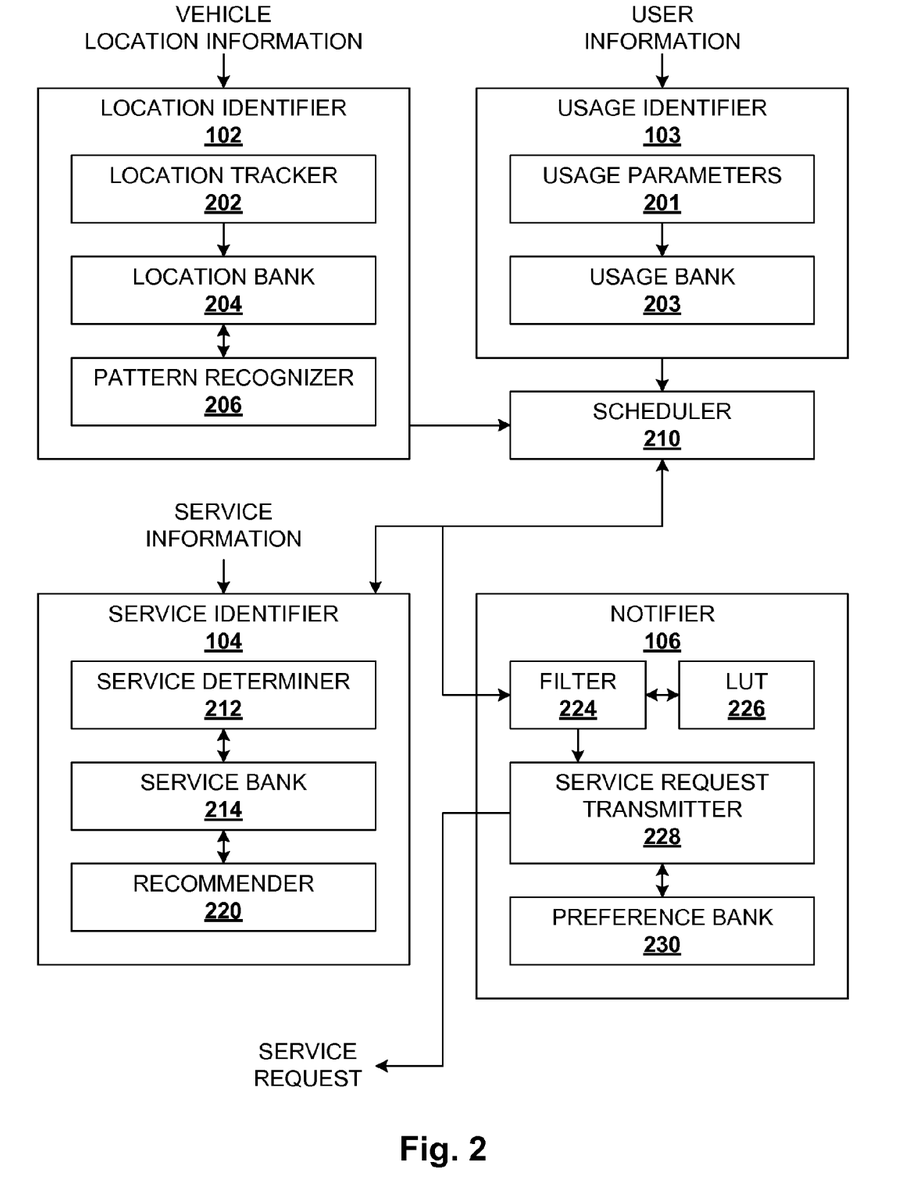
FIG. 2 is a detailed block diagram illustrating the system for vehicle maintenance, according to an embodiment.

Referring now to FIG. 2, a detailed implementation of the system 100 is provided, according to an embodiment. More specifically, the data flow, analysis and recommendation for vehicle servicing are described in further detail.

The location identifier 102 includes a location tracker 202, a location bank 204 and a pattern recognizer 206. The location tracker 202 can be located on the vehicle and may track the location of the vehicle over time to obtain tracked location information, wherein the future location is predicted based on the tracked location information. The location tracker 202 may include a global positioning receiver such as one that communicates with a global navigation satellite system, such as the global positioning system (GPS), and/or other navigational system.

The location information received by the location tracker 202 can be stored in a storage component such as a location bank 204. The location of the vehicle may be associated with information such as a day of the week, an arrival time, a departure time, other time related information or non-time related information. This information and/or other information can be stored with the vehicle location information in the location bank 204.

The pattern recognizer 206 recognizes location patterns based on the location information in the location bank 204. In one instance, the pattern recognizer 206 recognizes location patterns in the tracked location information, wherein the future location is predicted based on the recognized location patterns. The pattern recognizer 206 may recognize that to a large extent, the vehicle is located within the same general area for an extended period of time each week. Such a pattern may correlate to when the owner of the vehicle is at work. The pattern recognizer 206 may weight recognized patterns based on the frequency at which the vehicle is at a particular location. Such weighting may correspond to a confidence level and/or likelihood that the pattern will be repeated. In one example, the higher the weight, the more likely it is that the pattern will be repeated, and the lower the weight, the less likely it is that the pattern will be repeated. It is to be appreciated that the pattern recognizer 206 may use machine learning based on a priori knowledge and/or statistical or probabilistic information extracted from the patterns. Various algorithms can be employed, such as, for example, Bayesian classifiers, neural networks, and/or the like.

The usage identifier 103 includes usage parameters 201 and a usage bank 203. The usage parameters 201 can apply the above discussed parameters to determine likely usage locations and demands by a user. The analysis of the usage parameters 201, along with the user information input to the usage identifier 103, can be stored in a storage component such as the usage bank 203.

The location identifier 102 and the usage identifier 103 can communicate the gathered information (e.g., information in location bank 204 and usage bank 203) to a scheduler 210 to determine when and where the vehicle/user will be in the future. The scheduler 210 may communicate preferred dates, times and locations available for servicing with the service identifier 104.

The service identifier 104 includes a service determiner 212, a service bank 214 and a recommender 220. The service determiner 212 determines the type of maintenance that should be performed. For example, as noted above, the service identifier 104 may communicate with the vehicle's fault system. As such, when a fault condition is recognized by the vehicle, the service determiner 212 is notified of the fault. The information may include a signal or service flag indicative of the fault. For example, a particular service flag or signal may indicate that there may be a problem with the oil system. In one instance, the service determiner 212 is able to obtain and/or determine more detailed information is available, such as the oil pressure is outside of a preset range, the oil pump has failed, etc.

The service determiner 212 may communicate with the service bank 214, which may include a manufacturer maintenance schedule and/or an owner maintenance schedule defined by the manufacturer and/or user. For example, a manufacturer schedule may include the maintenance schedule provided by the manufacturer such as the schedule typically found in the owner's manual. The owner maintenance schedule may include the service milestones set by the owner such as when to have an emissions test, replace the windshield wipers, etc. The service determiner 212 may periodically check the manufacturer schedule and/or the owner schedule to see if a service milestone has been reached.

The service identifier 104 may also include the recommender 220 that recommends other service(s) based on the manufacturer schedule, the owner schedule, and/or a service history. For example, the recommender 220 may recommend changing the oil since manufacturer schedule indicates that the oil needs to be changed within the next 100 miles. A threshold for a service can be set so that the recommender 220 can determine when and when not to recommend a service be performed.

In one instance, the recommender 220 may compute a cost and/or utility metric associated with performing the service earlier than scheduled, and determine whether to recommend the service based on the cost and/or utility metric. The recommender 220 may, in some instances, provide such metrics to the user.

In another instance, the recommender 220 may recommend replacing the windshield wiper blades since the user schedule indicates that they should be replaced before winter. Once replaced, user schedule can be updated so that the recommender 220 does not recommend replacing the windshield wiper blades until the following year. In yet another instance, the recommender 220 may recommend rotating and/or balancing the tires when replacing the brake pads since, historically, the user has rotated and/or balanced the tires when the brake pads were replaced.

The service identifier 104 may communicate with the scheduler 210 to determine when, where and what services should be performed on a vehicle. The determined services to be performed may be relayed to a filter 224 in the notifier 106 and/or to one of the mechanic, the user of the vehicle, or a third party.

The filter 224 may filter the locations schedule based on the service to be performed. For instance, the filter 224 may use a look up table 226 (LUT) to determine an estimated time for the service. If the service is estimated to take longer than the time in which the vehicle is estimated to be at a location, the location may be removed from a list of service providers, or otherwise marked as such, since the service potentially cannot be completed when the vehicle is at the location. Upon filtering such locations, the filter 224 may determine whether a recommended service can be performed in conjunction with the required service at a particular location. If the recommended service cannot be performed at any of the locations, the filter ignores or otherwise marks the recommended service as such.

A service request transmitter 228 transmits the location schedule and/or the filtered location schedule and the service information, including the service to be performed and the recommended service, to a recipient. The service request transmitter 228 may determine a suitable recipient based on information stored in a preferences bank 230 that indicates at least a recipient of the first parameter. Such information may include a particular mechanic, a service station, a third party, and/or other information related to selecting the recipient. Other information stored in the preference bank 230 may include a method of payment, billing information, contact information such as a telephone number, an email address, a cell phone number, etc., a manufacturer of parts, a particular grade of product (e.g., SAE number, synthetic oil, additive, etc.), a particular type of product (e.g., rebuild or new), etc.

Figure 3:
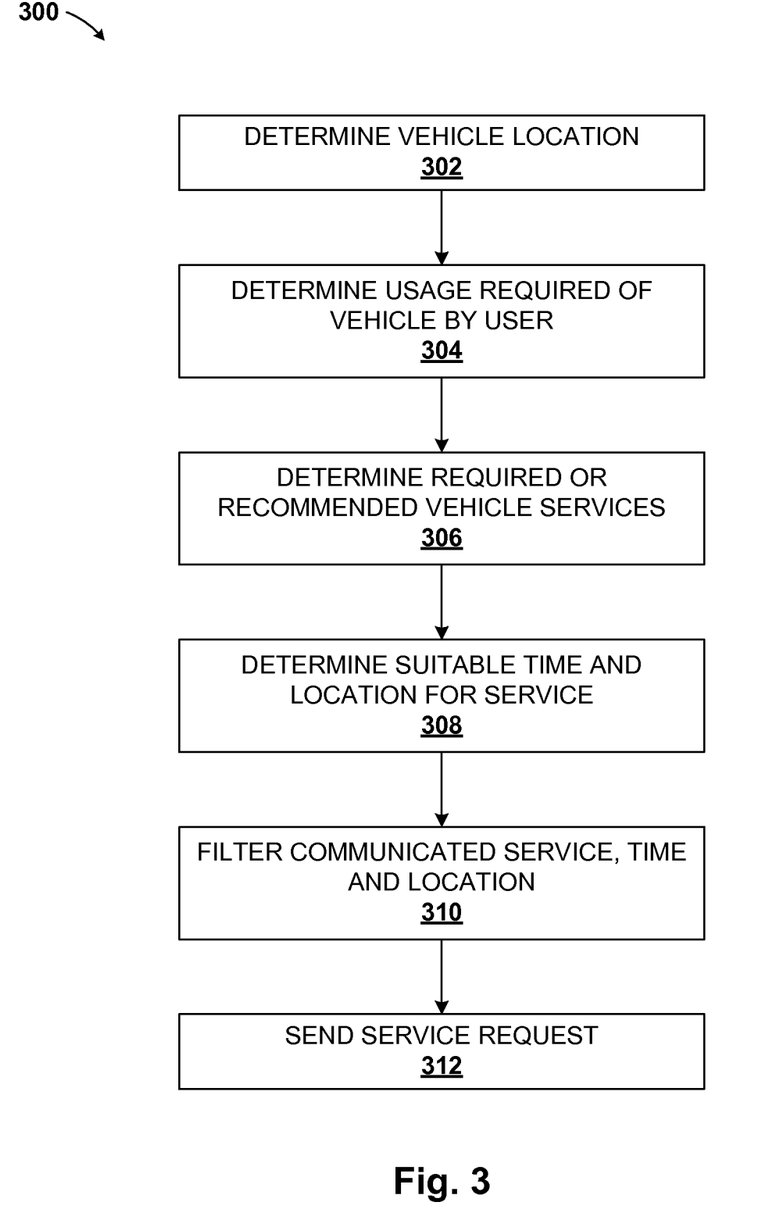
FIG. 3 is a flowchart depicting operational steps for the vehicle maintenance system, according to an embodiment.

Referring now to FIG. 3, an exemplary flowchart 300 is provided, according to an exemplary embodiment. More specifically, a data flow and analysis done by the system 100 is illustrated. It should be noted, the FIG. 3 depicts one of many possible embodiments performed by the system 100, such that data being shared may be compiled and communicated in several different ways before service scheduling.

In the illustrated embodiment, the system 100 can gather and determine vehicle location from vehicle data input by any of above described sources (Step 302). Next, the system 100 can analyze user information to determine user schedule, usage of vehicle, and/or any other user information described above (Step 304). The system 100 may determine required or recommended services to be performed (Step 306). Using the scheduler 210, described above, the system 100 may now determine the time and location of a service to be performed on the vehicle (Step 308). System 100 can filter the information received from the above steps to determine which service providers can perform the services needed (Step 310). Once the time, location, service and service provider is determined, a notification can be sent to the service provider to schedule the service (Step 312).

Figure 4:
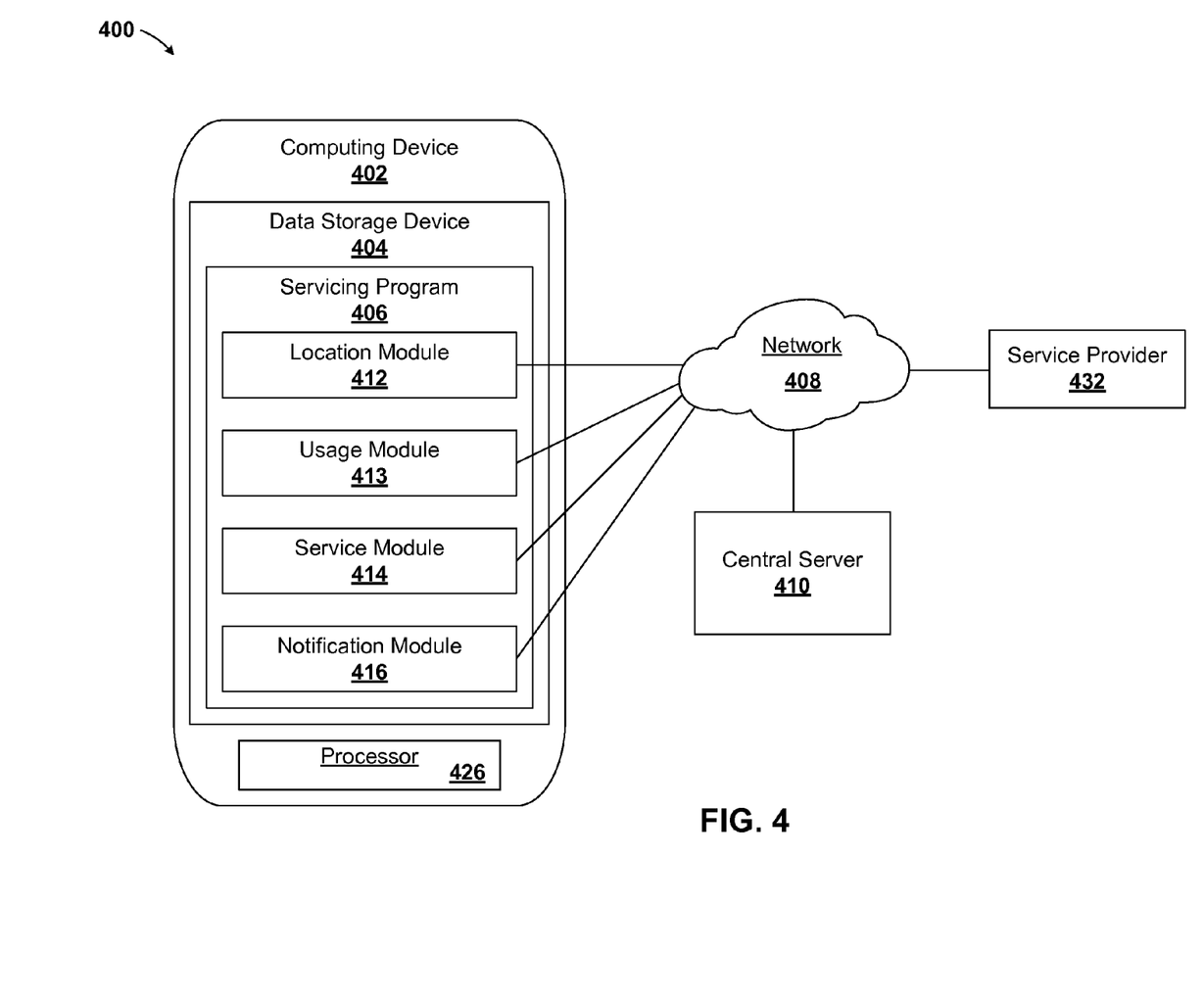
FIG. 4 is a block diagram illustrating a networked environment for vehicle maintenance, according to an embodiment.

Referring now to FIG. 4, a computer network environment 400 that supports system 100 (described with reference to FIGS. 1-3) is provided, according to an embodiment. More specifically, the system 100 may be performed by a computing device 402 that communicates with an optional central server 410 and a service provider 432 via a network 408.

The computer network environment 400 may include a plurality of computing devices 402 and/or servers 410, only one embodiment of which is shown. The computer network environment 400 may include various types of communication networks, such as a wide area network (WAN), local area network (LAN), a telecommunication network, a wireless network, a public switched network and/or a satellite network. It should be appreciated that FIG. 4 provides only an illustration of one implementation and does not imply any limitations with regard to the environments in which different embodiments may be implemented. Many modifications to the depicted environments may be made based on design and implementation requirements.

The computing device 402 may be an on-board function of the vehicles computer system, an external device or any other device or function capable of supporting a servicing program 406. The computing device 402 has a processor 426 and a data storage device 404 that is enabled to run the servicing program 406. The servicing program 406 may be stored on the data storage device 404. The servicing program 406 can have dedicated modules that perform specific tasks required by system 100. For example, the location identifier 102 may be performed by a location module 412; the usage identifier 103 may be performed by a usage module 413; the service identifier 104 may be performed by a service module 414; and the notifier 106 may be performed by a notification module 416.

The communications network 408 may include connections with the computing device 402, the server 410, and the service providers' 432 using any known communication link technology, such as, for example, wired or wireless communication. Server 410 may be a laptop computer, tablet computer, netbook computer, personal computer (PC), a desktop computer, a personal digital assistant (PDA), a smart phone, a SMS capable phone, or any programmable electronic device capable of communicating with computing device 402 via network 408. Service provider 432 may be any vehicle service provider. If the service provider 432 is not networked to the computing device 402 via network 408, other communication methods may be used, such as, for example, a telephone or the internet.

Figure 5:
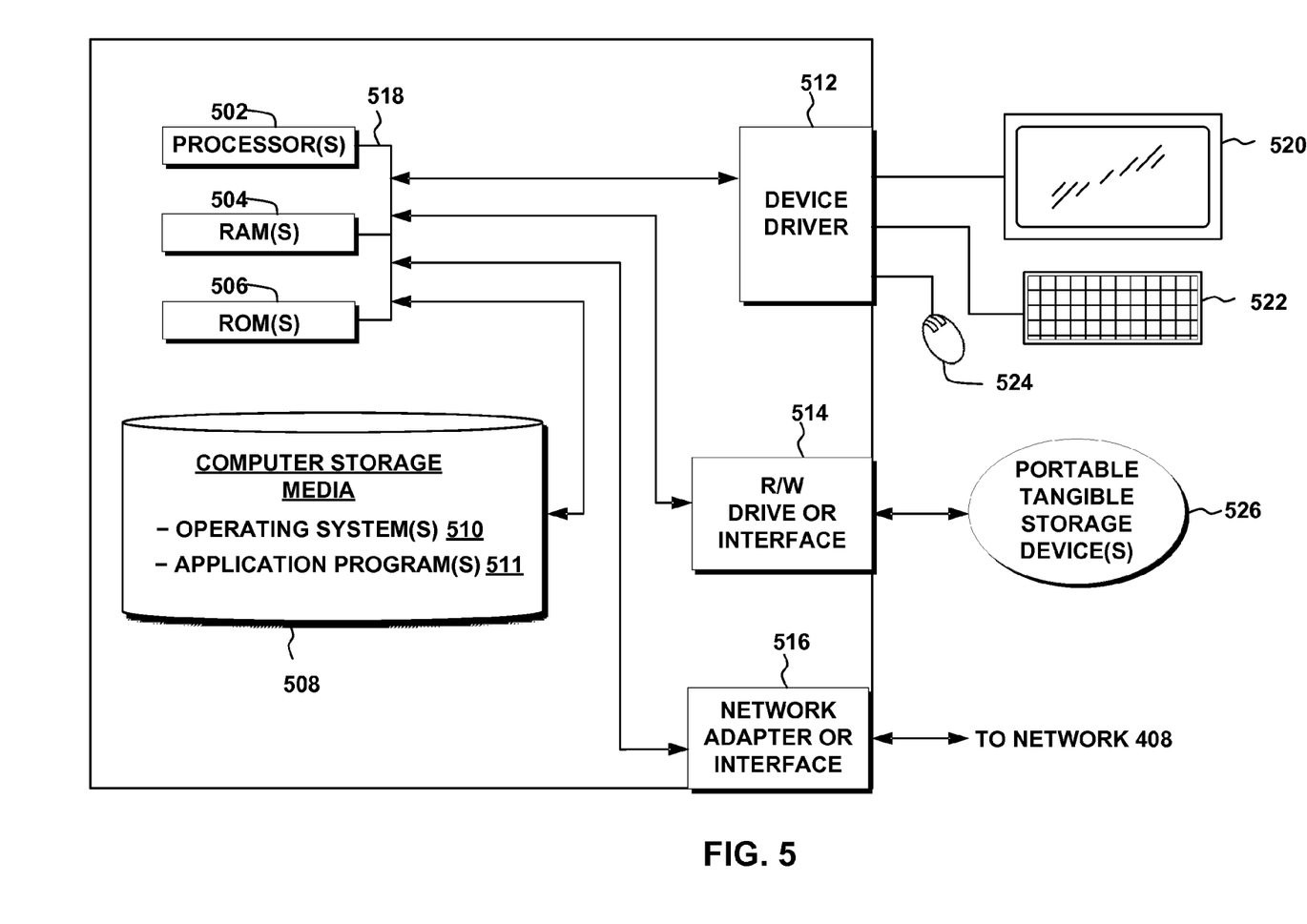
FIG. 5 is a block diagram illustrating components of a computing device used for vehicle maintenance.

Referring now to FIG. 5, a block diagram of components of the computing device 402 (described in reference to FIG. 4) is provided, according to an embodiment. It should be appreciated that FIG. 5 provides only an illustration of one implementation and does not imply any limitations with regard to the environments in which different embodiments may be implemented. Many modifications to the depicted environment may be made.

The computing device 402 (described with reference to FIG. 1) may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, servicing program 406, may be stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device 402 may also include an R/W drive or interface 514 to read from, and write to, one or more portable computer readable storage media 526. Application program 511 may be stored on one or more of the portable computer readable storage media 526, read via the respective R/W drive or interface 514 and loaded into the respective computer readable storage media 508.

The computing device 402 may also include a network adapter or interface 516, such as a TCP/IP adapter card or wireless communication adapter (such as a 4G wireless communication adapter using OFDMA technology). Application programs 511 may be downloaded from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

The computing device 402 may also include a display screen 520, a keyboard or keypad 522, and a computer mouse or touchpad 524. Device drivers 516 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for vehicle maintenance, the method comprising:
    receiving, from a global positioning system receiver, location data associated with a vehicle;
    predicting a future vehicle location based on a vehicle location history using the received location data;
    predicting future vehicle usage information based on information collected from a user's social media account, data corresponding to a categorization factor associated with one or more future uses of the vehicle, data corresponding to an importance value associated with the one or more future uses of the vehicle, data corresponding to a grouping of the one or more future uses of the vehicle as related, data corresponding to an interruptibility factor associated with each of the one or more future uses of the vehicle; and one or more direct inputs by the user;
    identifying maintenance needs of the vehicle;
    determining available times for vehicle maintenance based on the future vehicle location and the future vehicle usage information;
    locating a vehicle maintenance service provider based on the future vehicle location, the user information and the vehicle maintenance needs;
    scheduling a time for vehicle maintenance with a vehicle maintenance service provider; and
    notifying the user of the scheduled time and a location associated with the vehicle maintenance service provider.

2. The method of claim 1, further comprising:
    sending a notification to the vehicle maintenance service provider based on the identified maintenance needs of the vehicle.

3. The method of claim 1, wherein determining the future vehicle location comprises:
    analyzing the vehicle location history based on vehicle location history gathered using GPS data.

4. The method of claim 1, wherein the maintenance needs of the vehicle are identified based on one or more of a maintenance schedule, vehicle based sensing system and a service history.

5. The method of claim 1, wherein the user information includes a user's calendar.

6. A computer program product for vehicle maintenance, the computer program product comprising:
    one or more non-transitory computer-readable storage media and program instructions stored on the one or more computer-readable storage media, the program instructions comprising:
    program instructions to receive, from a global positioning system receiver, location data associated with a vehicle;
    program instructions to predict a future vehicle location based on a vehicle location history using the received location data;
    program instructions to predict future vehicle usage information, based on information collected from a user's social media account, data corresponding to a categorization factor associated with one or more future uses of the vehicle, data corresponding to an importance value associated with the one or more future uses of the vehicle, data corresponding to a grouping of the one or more future uses of the vehicle as related, data corresponding to an interruptibility factor associated with each of the one or more future uses of the vehicle; and one or more direct inputs by the user;
    program instructions to identify maintenance needs of the vehicle;
    program instructions to determine available times for vehicle maintenance based on the future vehicle location and the future vehicle usage information;
    program instructions to locate a vehicle maintenance service provider based on the future vehicle location, the user information and the vehicle maintenance needs;
    program instructions to schedule a time for vehicle maintenance with a vehicle maintenance service provider; and
    program instructions to notify the user of the scheduled time and a location associated with the vehicle maintenance service provider.

7. The computer program product of claim 6, further comprising:
    program instructions to send a notification to the vehicle maintenance service provider based on the identified maintenance needs of the vehicle.

8. The computer program product of claim 6, wherein the program instructions to determine the future vehicle location comprises:
    program instructions to analyze the vehicle location history based on vehicle location history gathered using GPS data.

9. The computer program product of claim 6, wherein the maintenance needs of the vehicle are identified based on one or more of a maintenance schedule, vehicle based sensing system and a service history.

10. The computer program product of claim 6, wherein the user information includes a user calendar.

11. A computer system for vehicle maintenance, the computer system comprising:
    one or more computer processors;
    one or more non-transitory computer-readable storage media; and
    program instructions stored on the computer-readable storage media for execution by at least one of the one or more computer processors, the program instructions comprising:
    program instructions to receive, from a global positioning system receiver, location data associated with a vehicle;

program instructions to predict a future vehicle location based on a vehicle location history using the received location data;

program instructions to predict future vehicle usage information, based on information collected from a user's social media account, data corresponding to a categorization factor associated with one or more future uses of the vehicle, data corresponding to an importance value associated with the one or more future uses of the vehicle, data corresponding to a grouping of the one or more future uses of the vehicle as related, data corresponding to an interruptibility factor associated with each of the one or more future uses of the vehicle; and one or more direct inputs by the user;

program instructions to identify maintenance needs of the vehicle;

program instructions to determine available times for vehicle maintenance based on the future vehicle location and the future vehicle usage information;

program instructions to locate a vehicle maintenance service provider based on the future vehicle location, the user information and the vehicle maintenance needs;

program instructions to schedule a time for vehicle maintenance with a vehicle maintenance service provider; and program instructions to notify the user of the scheduled time and a location associated with the vehicle maintenance service provider.

12. The computer system product of claim 11, further comprising:

program instructions to send a notification to the vehicle maintenance service provider based on the identified maintenance needs of the vehicle.

13. The computer system product of claim 11, wherein the program instructions to determine the future vehicle location comprises:

program instructions to analyze the vehicle location history based on vehicle location history gathered using GPS data.

14. The computer system product of claim 11, wherein the maintenance needs of the vehicle are identified based on one or more of a maintenance schedule, vehicle based sensing system and a service history.

* * * * *